Jan. 20, 1970  HANS-CHRISTOF KLEIN  3,490,229
TURBINE-POWERED PRIME MOVER

Filed May 20, 1968  2 Sheets-Sheet 1

INVENTOR.
HANS-CHRISTOF KLEIN
BY
Karl F. Ross
ATTORNEY

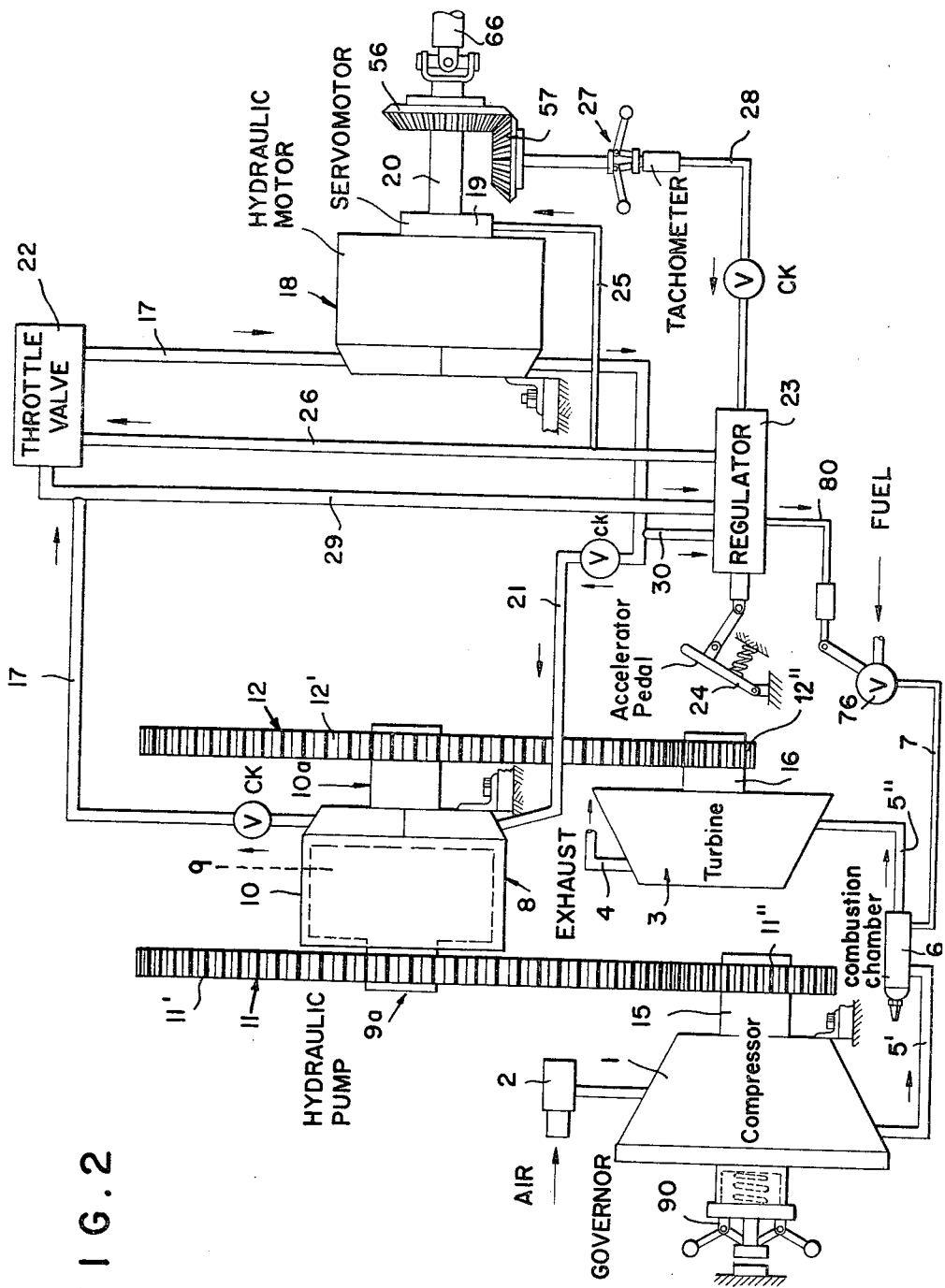

United States Patent Office 3,490,229
Patented Jan. 20, 1970

3,490,229
TURBINE-POWERED PRIME MOVER
Hans-Christof Klein, Hattersheim, Germany, assignor to Alfred Teves G.m.b.H., Frankfurt am Main, Germany, a corporation of Germany
Filed May 20, 1968, Ser. No. 730,569
Claims priority, application Germany, May 24, 1968, T 33,932
Int. Cl. F02b 41/00; F16d 31/06; F01k 3/18
U.S. Cl. 60—19                                6 Claims

ABSTRACT OF THE DISCLOSURE

System with a hydraulic pump having two relatively rotatable members respectively coupled with a gas turbine and with a compressor therefor while delivering oil under pressure to a hydraulic motor. Two gear trains of different transmission ratios are interposed between the pump members, on the one hand, and the turbine and compressor, on the other hand, in order to let the turbine rotate even under no-load conditions at an optimum speed different from that of the compressor.

---

Figure 1:
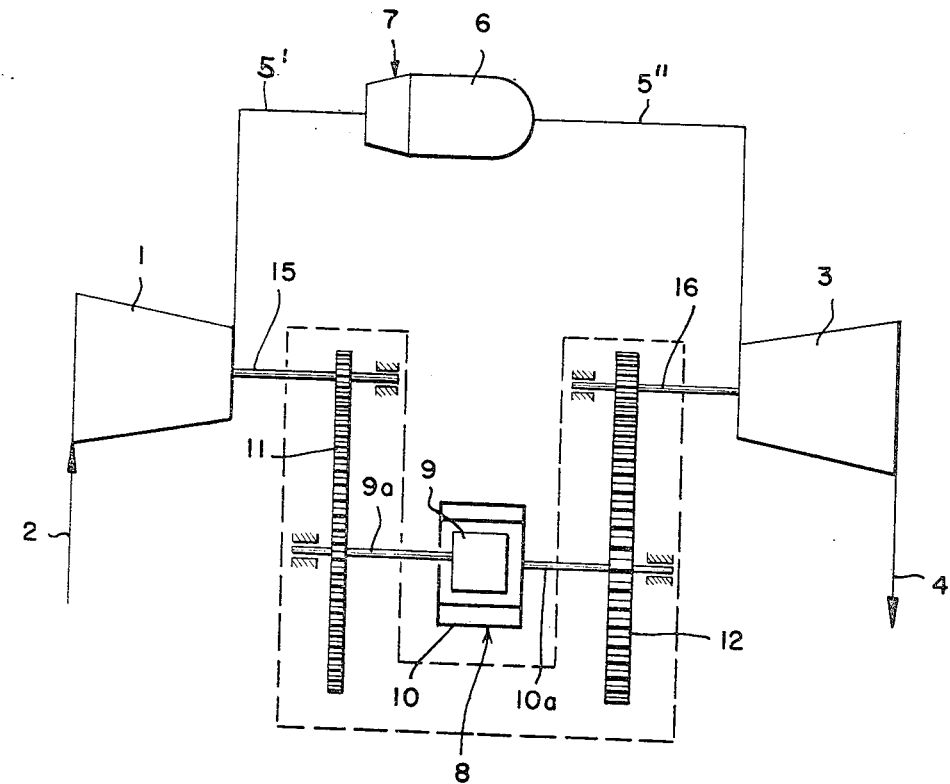

My present invention relates to a prime-mover system of the general type disclosed in my prior U.S. Patent No. 3,274,768.

The system of my prior patent, used preferably to power an automative vehicle, comprises a hydraulic pump with two relatively rotatable members, i.e. a piston-supporting housing and a swash plate coacting with the pistons, which are respectively coupled with a gas turbine and with a compressor therefor. A hydraulic motor, connectable to a load such as the traction wheels of the vehicle, is actuated by a hydraulic fluid (generally oil) under pressure which leaves the pump at a rate commensurate with the relative speed of the two pump members, i.e. with the slip between the output shaft of the turbine and the driven shaft of the compressor. Under no-load conditions, the slip is zero and the supply of oil to the hydraulic motor is cut off; the turbine and compressor shafts then rotate in unison, at a speed determined by the throttled fuel supply and by the torque which must be overcome in order to drive the compressor of the idling prime-mover. When the vehicle is to be accelerated, the compressor shaft begins to lag behind the turbine shaft and the resulting speed differential supplies the needed motive fluid to the hydraulic motor; this acceleration is usually accompanied or initiated by a depression of the gas pedal of the vehicle to increase the fuel supply to the turbine.

At maximum load, i.e. with wide-open throttle, the turbine shaft may outrun the compressor shaft at a rate of approximately 3,000 revolutions per minute, a preferred range being 53,000 turbine r.p.m. compared with 50,000 compressor r.p.m. which corresponds to the range of greatest efficiency of currently available equipment of this type. As the load decreases, e.g. when the vehicle speed levels off on straight forward driving, a servomotor associated with the hydraulic motor may reduce the stroke and thereby the torque of the latter so that the rate of fluid consumption by this motor decreases. In this manner, the capacity of the hydraulic motor can be so adjusted that the turbine operates at or near its optimum speed during both acceleration and cruising. During idling, however, the turbine speed is tied to the fixed speed of the compressor (e.g. 50,000 r.p.m.) and is therefore at less than its optimum value. Also, under certain load conditions (e.g. partly open throttle), the delivery rate of the hydraulic pump is restricted so that the slip between the turbine and compressor shafts is substantially less than the aforestated maximum-efficiency value of, say, 3,000 r.p.m.

The general object of my present invention is to provide an improved system of this type having means for enabling the turbine to operate at its high-efficiency level even when idling or under partial load.

Another object of this invention is to provide means in such a system for allowing the two differentially rotatable pump members to be driven at relatively low speed with reference to the turbine and compressor shafts, preferably at no more than about 6,000 r.p.m., in order to simplify the delivery of hydraulic fluid to and from the pump by way of conventional fluid joints.

These objects are realized, pursuant to my present invention, by the provision of two separate transmissions (preferably gear trains) between the turbine and compressor and the two pump members coupled therewith, i.e. a stepdown transmission between the turbine shaft and the associated pump member (e.g. housing) and a step-up transmission between the other pump member (e.g. swash plate) and the compressor shaft. With suitable choice of the transmission ratios of the two gear trains or their equivalents, the turbine will be allowed to operate in its range of greatest efficiency (e.g. around 53,000 r.p.m.) in the absence of relative motion between the two pump members while the compressor turns at its own preferred rate of, say, 50,000 r.p.m. It is also feasible with this arrangement to step down the turbine speed by a ratio of, say, 53:6 so that the pump housing turns at 6,000 r.p.m., the corresponding step-up ratio between the swash plate and the compressor being then 6:50.

The invention will be described in greater detail hereinafter with reference to the accompanying drawing in which:

FIG. 1 is a flow diagram illustrating the principal elements of a prime mover embodying the present improvement; and FIG. 2 is a more detailed diagram showing the same elements in their structural relationship.

The system illustrated in the drawing is generally similar to that of my aforementioned U.S. Patent No. 3,274,768 and includes, particularly in FIG. 2, a number of elements which have been designated by the same reference numerals as in the patent and therefore need not be described in detail.

The basic constituents of the prime mover according to this invention include a compressor 1 with an air intake 2, a turbine 3 with an exhaust 4, a combustion chamber 6 with a fuel inlet 7, and a hydraulic pump 8 having two relatively movable members 9, 10 whose shafts 9a, 10a are positively coupled with a compressor shaft 15 and a turbine shaft 16 via respective transmissions 11 and 12. A combustion-sustaining fluid, i.e. air, is delivered in a densified state by compressor 1 to a combustion chamber 6 through a conduit 5', the expanding combustion gases being fed from this chamber to the turbine 3 by way of a conduit 5".

Transmission 11 has been shown in FIG. 2 as a gear train consisting of a large gear 11' on shaft 9a and a small pinion 11" on shaft 15, the tooth ratio of these two gears being assumed to be on the order of 10:1 and, preferably, equal to approximately 50:6. Transmission 12 has been similarly shown in FIG. 2 as consisting of a large gear 12' on shaft 10a and a small gear 12" on shaft 16 whose tooth ratio is of the same order of magnitude as that of gears 11', 11" but somewhat larger than the latter, specifically about 53:6 in the preferred case. Since gear train 12 is a step-down transmission and gear train 11 is a step-up transmission, the transmission ratio of the former is greater than the reciprocal of the transmission ratio of the latter.

As in the system of my prior patent, the pump member 9 coupled with the compressor may be a swash plate while the pump member 10 coupled with the turbine is a housing rigid with a distributor and a set of piston cylinders which have not been illustrated.

The system shown in FIG. 2 additionally includes a throttle valve 22 for a hydraulic motor 18 whose output shaft 20 drives a load, shown as a vehicular drive shaft 66, and is also coupled through bevel gears 56, 57 with a tachometer 27 acting upon a regulator 23 through a conduit 28; the regulator is also responsive to operation of an accelerator pedal 24 and, via a line 80, determines the rate of fuel supply to inlet 7 of combustion chamber 6 by means of a dosing valve 76. Regulator 23 further controls the application of fluid pressure from a discharge pipe 17 of pump 8 to throttle valve 22 via conduits 29 and 26 while being itself subject to fluid-pressure control through a branch 30 of a conduit 21 forming a return path from motor 18 to pump 8. The hydraulic motor 18 is shown provided with a servomotor 19 which, through a fluid line 25, progressively reduces the effective stroke of motor 18 at high vehicle speeds in order to limit the oil intake of this motor to a value corresponding to only a moderate increase of the turbine speed with reference to no-load conditions. If the servomotor 19 were omitted, the speed of compressor shaft 15 (shown controlled by a governor 90) would have to be lowered in order to maintain the slip between pump shafts 9a and 10a in a range in which the turbine 3 operates at or near its peak of efficiency according to the hyperbolic law described in my earlier patent.

A description of the operation of the regulator 23 and the throttle valve 22 has been given in my prior patent and will not be repeated here.

When, with the transmission ratios indicated above, compressor shaft 15 and turbine shaft 16 rotate at their respective optimum speeds of 50,000 and 53,000 r.p.m., pump members 9 and 10 will rotate in unison at a speed of 6,000 r.p.m. which is low enough to permit the passage of hydraulic oil to and from the cylinders of housing 10 through conventional fittings equipped with commonly available fluid seals. The pump 8 should, of course, be of such a capacity that hydraulic motor 18 develops the necessary torque for acceleration of the vehicle or uphill driving in response to an increase in turbine speed well within the range of maximum efficiency, i.e. near the vertex of the hyperbola representing efficiency as a function of that speed. It must be remembered in this connection that any acceleration of turbine shaft 16 results in only a fractional increase of the speed of pump-housing shaft 10a.

Owing to the provision of the two gear trains 11 and 12, turbine shaft 16 will outrun the compressor shaft 15 under all operating conditions including the situation when, during downhill coasting, motor 18 acts as a pump to retard the rotation of housing 10 and turbine 3. Naturally, if the capacity of compressor 1 called for a differently regulated speed of shaft 15 for optimum performance, the transmission ratio of one or both gear trains 11, 12 would have to be altered under otherwise unchanged conditions.

It will be apparent that each gear train shown in the drawing could also be constituted by more than two gears and that equivalent transmission means, such as sprockets and chains, may be used in their stead.

I claim:
1. A prime-mover system comprising:
   a gas turbine having an output shaft;
   a compressor having a driven shaft and communicating with said gas turbine for supplying a combustion-sustaining fluid under pressure thereto;
   a hydraulic pump having a pair of relatively displaceable pump members, said pump being provided with an inlet connected to a source of hydraulic fluid and with an outlet for discharging said fluid at a rate commensurate with the relative speed of said pump members;
   step-down transmission means positively connecting said output shaft with one of said pump members for driving same at a fraction of the speed of said output shaft;
   step-up transmission means positively connecting said other of said pump members with said driven shaft for driving same at a speed substantially higher than that of said other of said pump members;
   and a hydraulic motor connectable to a load and coupled with said outlet for actuation by hydraulic fluid delivered by said pump.

2. A prime-mover system as defined in claim 1 wherein said step-up and step-down transmission means comprise a pair of gear trains.

3. A prime-mover system as defined in claim 2 wherein each of said gear trains comprises a pair of gears with a tooth ratio on the order of 10:1.

4. A prime-mover system as defined in claim 1 wherein said step-down transmission means has a transmission ratio greater than the reciprocal of the transmission ratio of said step-up transmission means whereby said output shaft rotates faster than said driven shaft under no-load conditions.

5. A prime-mover system as defined in claim 4 wherein said transmission ratios are so chosen as to make the speed ratio between said output shaft and said driven shaft equal to substantially 53:50.

6. A prime-mover system as defined in claim 5 wherein the transmission ratios of said step-down and step-up transmission means are substantially equal to 53:6 and 6:50, respectively.

References Cited

UNITED STATES PATENTS

| | | | |
|---|---|---|---|
| 2,318,028 | 5/1943 | Thomas | 230—15 XR |
| 2,542,539 | 2/1951 | Kuhrt et al. | 60—13 |
| 2,659,528 | 11/1953 | Price | 230—114 |
| 3,039,267 | 6/1962 | Voreaux et al. | 60—53 |
| 3,058,297 | 10/1962 | Tolley | 60—19 |
| 3,274,768 | 9/1966 | Klein | 60—19 |

EDGAR W. GEOGHEGAN, Primary Examiner

U.S. Cl. X.R.
60—53, 59